March 10, 1936.    R. ELLIS    2,033,191
FREIGHT CONTAINER
Original Filed Dec. 9, 1933    2 Sheets-Sheet 2

INVENTOR
Ridsdale Ellis

Patented Mar. 10, 1936

2,033,191

UNITED STATES PATENT OFFICE 2,033,191

FREIGHT CONTAINER

Ridsdale Ellis, New York, N. Y.

Original application December 9, 1933, Serial No. 701,614. Divided and this application June 20, 1934, Serial No. 731,435

6 Claims. (Cl. 280—49)

This invention relates to freight containers provided with wheels so that they can be readily moved when desired. This application is a division of my application Serial No. 701,614, filed December 9, 1933.

The principal object of the present invention is to provide a wheeled container which may be moved on its wheels with a minimum of effort and which may be turned readily and in a very small radius.

Freight containers must be compact and have a high ratio of goods receiving space with respect to the total space occupied by the container as a whole. Further, it is desirable that the wheels are within the outer margins of the container as a whole to avoid possible injury to the wheels. Where cranes are available they will ordinarily be used to move containers even though the latter are provided with wheels, and when cranes are used the container may be swung against other containers or objects.

The radius within which a wheeled object can turn depends on the arrangement and number of the wheels. If two pairs of wheels are used, only one of which can be swung, as in the case of an ordinary automobile, the turning radius is considerable. This turning radius may be reduced by arranging so that both pairs of wheels may be swung simultaneously and in opposite directions, as in the case of the well-known hook-and-ladder fire truck. In that case the only limitation to the extent to which the radius of turning may be reduced is the extent to which the wheels may swing, since, if the wheels are swung 90°, the object will turn about its center and have a zero radius of turning. A zero radius of turning may also be obtained with only two wheels centrally arranged, like a Chinese wheel-barrow. In the latter case the wheels do not have to swing.

The ease with which a wheeled object can be moved over a fairly soft or uneven surface is largely a question of wheel diameter, the larger the wheel the easier it is to move the object. However, the larger the wheel, the more room it requires to swing. Hence, where, as in the case of containers economy of space is essential, the fixed two-wheel arrangement is preferable to the four-wheel swinging wheel arrangement.

With only two wheels the support is unstable. This objection can be overcome without materially increasing the effort required to push the object by the use of auxiliary wheels near each end of the object arranged so that under normal circumstances they carry only the unbalanced portion of the load. If the container loaded weighs 10,000 lbs. and the loading is uneven so that there is an unbalanced load of 1000 lbs. at one end, the central wheels carry 9000 lbs. and the auxiliary wheel or wheels at the heavier end of the container carry 1000 lbs.

If the auxiliary wheels are fixed so that they cannot swing to turn the container the auxiliary wheel or wheels at the heavy end of the container have to be dragged laterally across the container supporting surface under a pressure of 1000 lbs. Preferably, therefore, the auxiliary wheels are arranged to swing either through a limited arc or better still through 360°, as in the case of ordinary castor wheels. As these auxiliary wheels take only a very minor part of the load they may be made of small size so that the room space required to permit them to swing can be made correspondingly small.

If both the main and auxiliary wheels are fixed so that they are incapable of relative vertical movement other difficulties may arise. If the bottoms of all the wheels are in the same plane, then as soon as one or other of the auxiliary wheels strikes a high spot in the supporting surface the load is taken off the main wheels and is carried wholly by the auxiliary wheels. This means that the advantage of the size of the main wheels is wholly lost, at the time when it is most needed. However, if the bottoms of the main wheels are below the bottoms of the auxiliary wheels, the container can teeter about its main wheels to permit the auxiliary wheel or wheels to ride over high spots. Another way of overcoming the transfer of the main part of the load from the main wheels to the auxiliary wheels is to mount the latter on springs to that, while the main and auxiliary wheels all contact simultaneously with the supporting surface, the auxiliary wheels can move upwardly against the pressure of their springs to ride over high spots.

Ordinary castor wheels cannot be readily reversed without lateral movement of the object they support at least equal to the eccentricity of the castor mounting. In a freight container such lateral movement may be highly disadvantageous if not dangerous. For example, if the container is run lengthwise onto a truck platform the castors are by this movement turned towards the rear of the platform. When the container is pushed or pulled off the platform the castors have to turn towards the front of the platform and, if this turning movement results in a lateral movement of the container, the latter may easily run off one side of the platform. It is desirable, therefore, that the castors be of a straight tracking type so that they will reverse their position without producing objectionable lateral movement of the container.

Another object of the invention is to avoid the disadvantage of doors in one or both ends of the container, which heretofore have been standard construction. Doors render the containers liable to pilferage and numerous devices have been invented to prevent the doors being opened so long as the container is on its railroad truck. These door-locking devices all depend on the fact that the containers to which they were applied could only be moved by a crane and are not adapted to containers constructed so that they can be moved on their own wheels on and off a flat car. Another disadvantage of doors is that without special and hence expensive construction they are apt to let water enter in bad weather. Containers with doors are also not well adapted for transferring material in bulk, such as wheat, and one of the obstacles to the practical use of containers is that they are usually returned empty on hauls where manufactured goods are shipped out and wheat or the like is shipped back. For these and other reasons, the present container is constructed without doors and access to the interior is obtained by removing the roof or top either wholly or in part, as a unit or in sections.

While the weight of the roof is usually sufficient to prevent pilferage, it is far less than the weight of the container as a whole and hence its removal does not involve the necessity of heavy cranes or the like.

One suitable form of construction is illustrated by way of example, in the accompanying drawings, in which.

Figure 1:
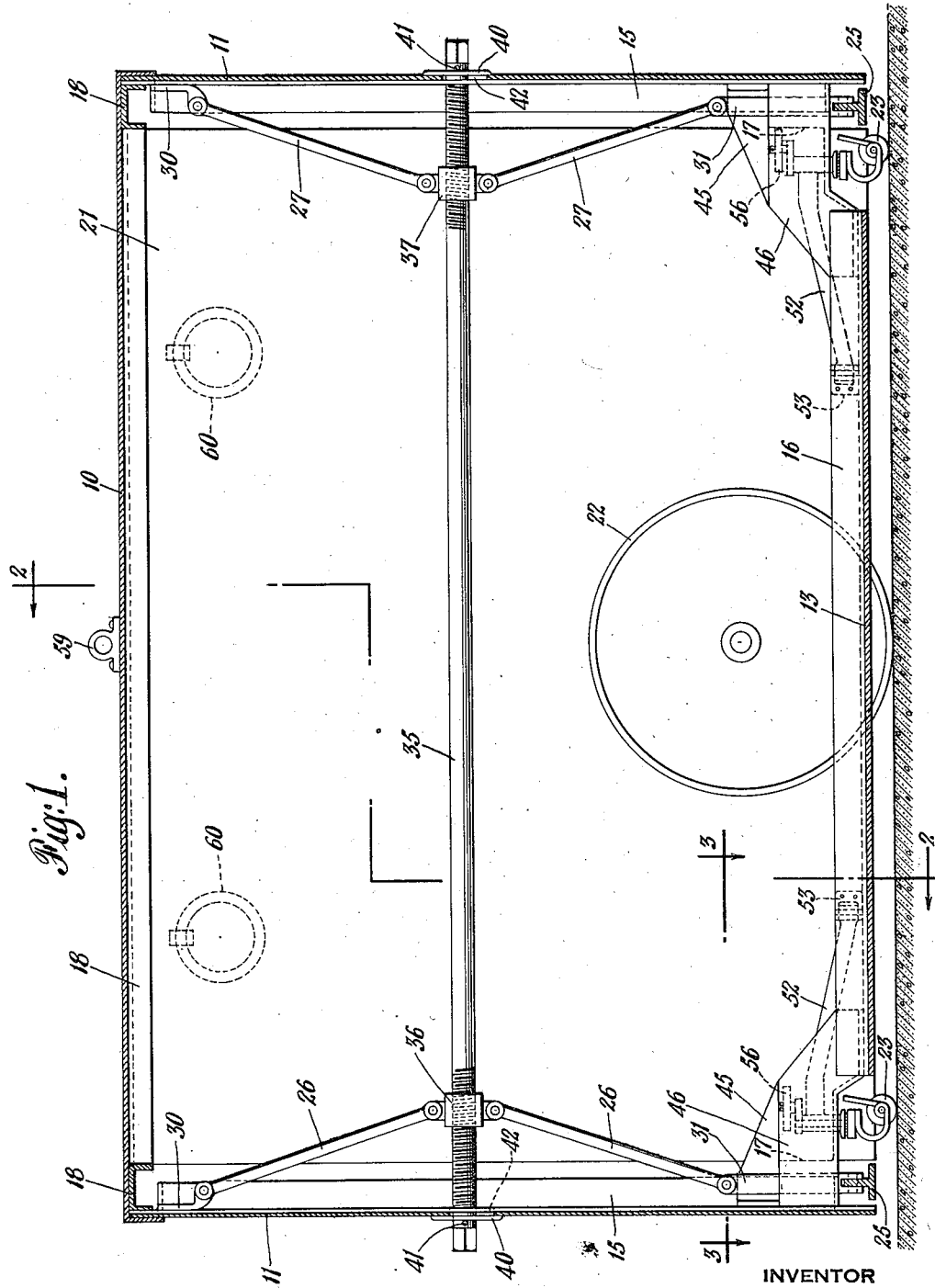
Fig. 1 is an elevation of the container with the outer side wall removed and parts in section.
Figure 2:
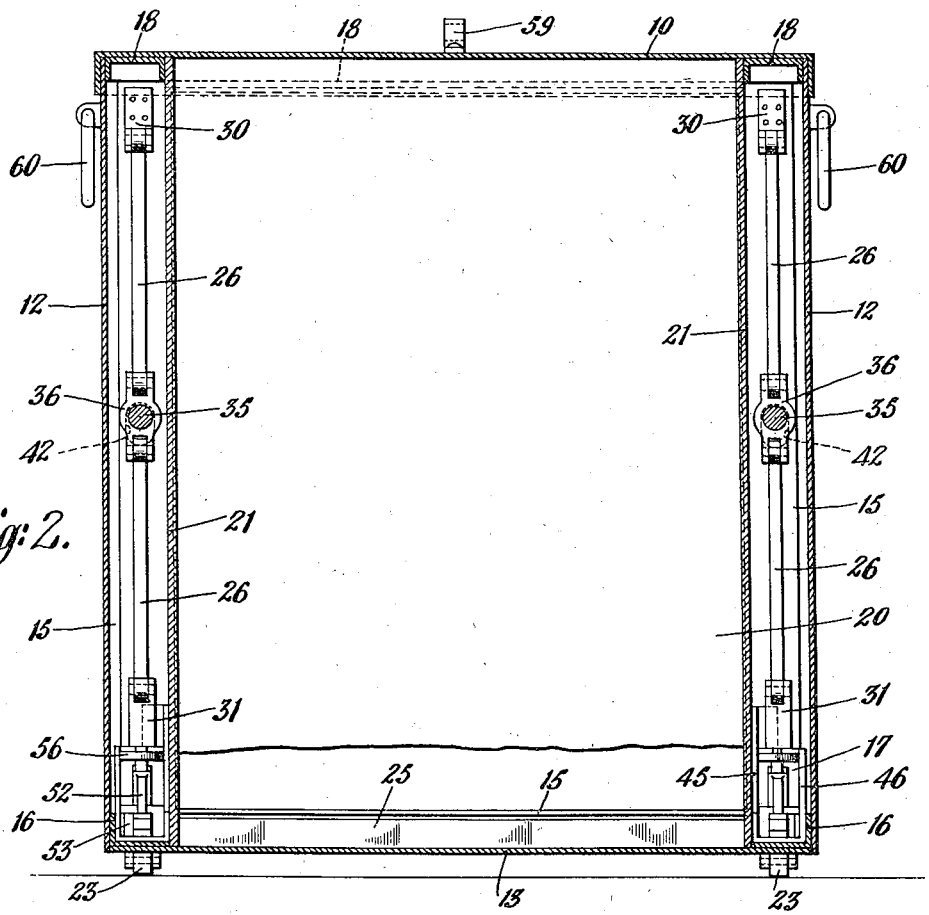
Fig. 2 is a section on the line 2—2 of Fig. 1.
Figure 3:
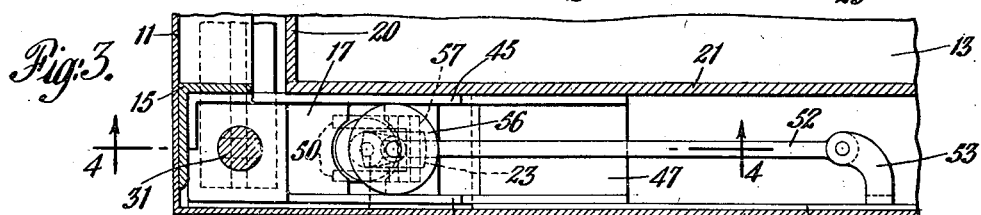
Fig. 3 is a section on the line 3—3 of Fig. 1.
Figure 4:
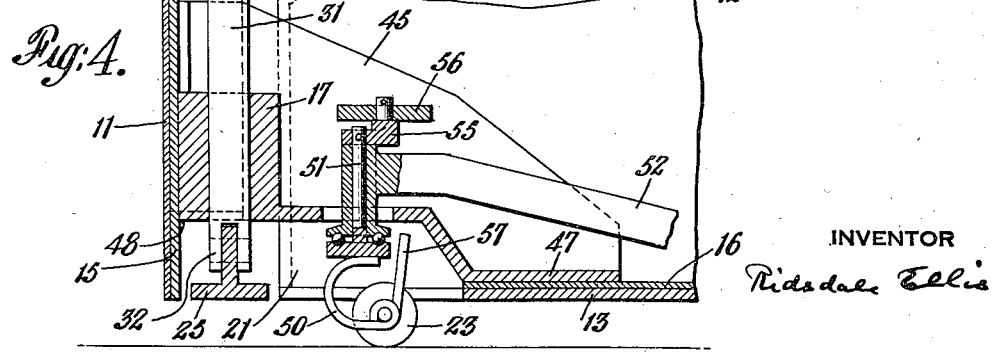
Fig. 4 is a section on the line 4—4 of Fig. 3.

The container comprises a top 10, outer end walls 11, outerside walls 12 and a bottom 13. Within the walls of the container is a frame comprising unitary rectangular end frames 15 of angular cross-section, as shown in Fig. 3, and bottom side frames 16, also of angular cross-section, as shown in Fig. 2, united to the end frames by steel castings 17. Inner end walls 20 and inner side walls 21 are provided for purposes which will be explained later. A frame 18 of inverted channel cross section extends around the top of the container and closes the space between the inner and outer end and side walls as well as stiffening the container as a whole.

In the spaces between the inner and outer side walls are arranged centrally disposed wheels 22 of large diameter. These wheels are suitably mounted on fixed bearings carried by the side walls. In the same spaces near each end of the container is a pair of castor wheels 23. These wheels enable the container to be moved around readily. When, however, it is desired to anchor the container on a flat car or other support for the container, the container is lifted off its wheels.

For this purpose means are provided for moving a portion of the base of the container downwardly and upwardly with respect to the housing, from a position above to a position below the bottom of the wheels, to lift the wheels out of contact with the container supporting surface and prevent further rolling movement of the container. As shown, the movable part of the base of the container comprises a T-bar 25 extending across each end of the container. These T-bars may be raised and lowered in a variety of ways.

One of the most convenient methods is by means of pairs of toggles 26 and 27. The upper arm or link of each toggle is connected by a bracket 30 to the adjacent end frame 15. The bottoms of the lower arm or link of each toggle is connected to a plunger 31 slidably mounted in one of the corner castings 17. The lower ends of these plungers are pivotally connected to the upstanding flanges of the T-bars by pins 32. The toggles are operated by shafts 35 having right hand threads at one end and left hand threads at the other. These threaded portions of the shafts 35 engage nuts 36 and 37 connected to the adjacent ends of the toggle links 26 and 27 respectively. Rotation of the shaft produces movement of the links 26 and 27 in opposite directions so that there is a minimum of tendency for the shaft to move axially as a whole. Should the container be loaded unevenly so that one end is heavier than the other the thrusts on the shafts will be unbalanced as the container is lifted off its wheels. There will also be unbalanced thrusts whenever one T-bar lifts its end of the container before the other. These unbalanced thrusts are taken by plates 40 held in position by pins 41. As the toggles straighten out the shaft 35 drops and to allow for this movement the outer end walls 11 and end frames 15 are slotted at 42.

The projecting ends of the shafts 35 are squared for the application of a handle or wrench thereto. It will be noted that the two shafts 35 on the two sides of the container are not connected for simultaneous operation, so that first one end of each pair of T-bars are depressed and then the other. The pivotal connection between the T-bars and plungers 31 permits this method of depressing the T-bars.

The castings 17 in which the plungers 31 slide are formed with two side wings or gusset plates 45 and 46 integrally connected at the bottom by the part 47. The bottom side frames 16 are riveted to the plates 46 and parts 47. The end frames 15 are riveted to the plates 45 and welded to the lower part of the castings 17 at 48.

Beneath the parts 47 are arranged the castor wheels 23. Each of these wheels is carried by a pair of curved springs 50 secured to the lower end of a shaft 51 rotatably mounted on the adjacent side frame 16 by a bracket 53. At the top of the shaft 51 is mounted an arm 55 carrying a wheel 56 of the same diameter as the distance between the plates 45 and 46. This wheel is arranged so that its center is directly over the point of contact with the ground of the mid-point of the castor wheel 23. As the result of this construction whenever the castor wheel turns, i. e., changes its plane of rotation with respect to the container, the point of contact of the center of the castor wheel with the ground moves along a line parallel to the side of the container instead of in a circular path with respect to the latter. As the castor wheel starts to move outwardly with respect to the side of the container the wheel 56 starts to pull the shaft 51 inwardly to the same extent and vice versa. Hence in spite of its castor wheels the container will track straight and the castors in reversing will not throw the ends of the container laterally.

As the primary function of the castor wheels is to balance the container on its supporting wheels 22 and prevent teetering, the springs 50 are light. To prevent these springs being overloaded, if not broken, and also to relieve the arms 52 of undue strain should the castor wheels for any reason have to take the full load of the container, U-shaped stops 57 are provided. These stops are welded to the castor wheel journals and contact with the under surface of the part 47 whenever the springs 50 are compressed to a predetermined extent.

The inner side walls 21 are provided to keep the goods carried by the container out of contact with the wheels 22, toggle arms 26, 27 and shaft 35 and other parts.

The inner end walls are provided to give an unbroken inner wall extending from the bottom of the container, which is below the top of the T-bars when elevated, to the top of the side walls, which are above the inwardly projecting flanges of the end frames.

If it is desired to use the containers for perishable goods the inner walls may be made of plywood or other material of low heat conductivity as compared with metal. In addition, cork or other insulation may be inserted between the inner and outer end walls and between such parts of the inner and outer side walls as are not occupied by the toggle mechanism, wheels 22 and other parts. Insulation may also be provided on the floor and underside of the roof.

No doors are provided in the ends of the container and hence the roof or top 10 is detachable so that access may be obtained to the interior of the container. A ring 59 is provided in the middle of the top 10 to allow it to be lifted off and replaced on the container. Rings 60 are provided on the sides of the container to allow it to be lifted as a unit when desired.

I claim:

1. A freight container comprising bottom, end and side walls defining a goods receiving space, the lower part of the side walls throughout substantially their entire length being spaced inwardly from the outer margin of the container at the bottom thereof, non-swingable load-supporting wheels of relatively large diameter arranged in the spaces between said side walls and said outer margins of the container substantially midway between the ends of the container, and castor wheels of relatively small diameter on either side of the first wheels arranged to turn within said spaces.

2. A freight container comprising bottom, end and side walls defining a goods receiving space, the lower part of the side walls being spaced inwardly from the outer margin of the container at the bottom thereof, non-swingable load-supporting wheels of relatively large diameter arranged in the spaces between said side walls and said outer margins of the container substantially midway between the ends of the container, and spring mounted castor wheels of relatively small diameter on either side of the first wheels and within the outer margins of the container.

3. A freight container comprising bottom, end, and side walls defining a goods receiving space, the lower part of the side walls throughout substantially their entire length being spaced inwardly from the outer margin of the container at the bottom thereof, non-swingable load-supporting wheels of relatively large diameter arranged in the spaces between said side walls and said outer margins of the container, substantially midway between the ends of the container, and straight tracking castor wheels on either side of the first wheels.

4. In a freight container comprising bottom, end and side walls defining a goods receiving space, the lower part of the side walls throughout substantially their entire length being spaced inwardly from the outer margin of the container at the bottom thereof, non-swingable load-supporting wheels of relatively large diameter arranged in the spaces between said side walls and said outer margins of the container substantially midway between the ends of the container, and spring-mounted castor wheels also arranged in said spaces on either side of the first wheels.

5. A freight container comprising bottom, end and side walls defining a goods receiving space, the lower part of the side walls throughout substantially their entire length being spaced inwardly from the outer margin of the container at the bottom thereof, non-swingable load-supporting wheels of relatively large diameter arranged in the spaces between said side walls and said outer margins of the container, substantially midway between the ends of the container and straight tracking castor wheels of relatively small diameter on either side of the first wheels arranged to turn within said spaces.

6. A freight container comprising a housing having double side walls, bottom and end walls, non-swingable load-supporting wheels of relatively large diameter arranged substantially midway between the ends of the container, and straight tracking castor wheels of relatively small diameter on either side of the first wheels arranged to turn within the spaced side walls.

RIDSDALE ELLIS.